Dec. 3, 1957 A. E. LA FLEUR 2,815,063
PLASTIC BAG MAKING MACHINE
Filed Jan. 17, 1955 4 Sheets-Sheet 1
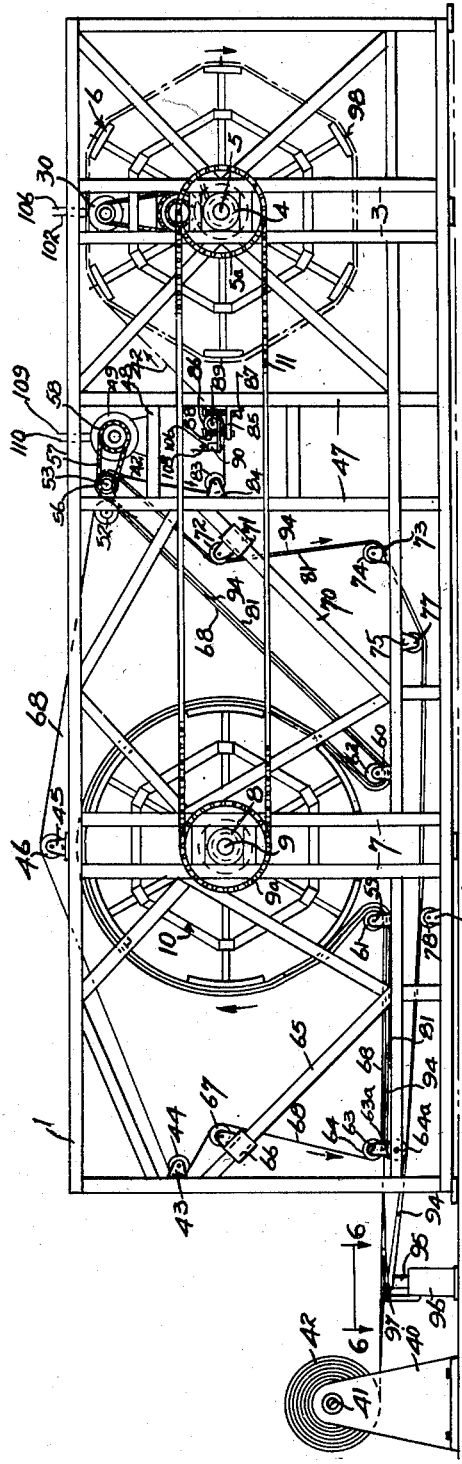
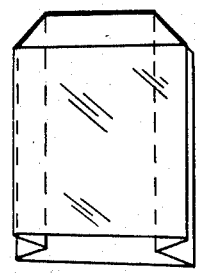
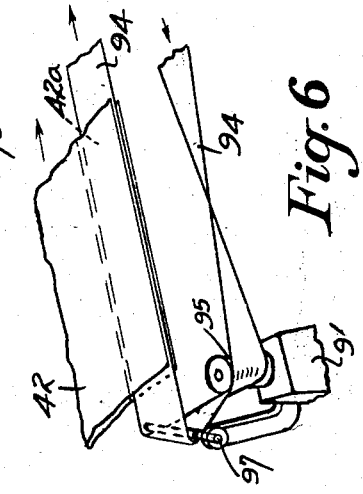
INVENTOR.
ARTHUR E. LA FLEUR
BY
ATTORNEY Dec. 3, 1957 A. E. LA FLEUR 2,815,063
PLASTIC BAG MAKING MACHINE
Filed Jan. 17, 1955 4 Sheets-Sheet 2

INVENTOR.
ARTHUR E. LA FLEUR
BY
Gerald S. Baldwin
ATTORNEY

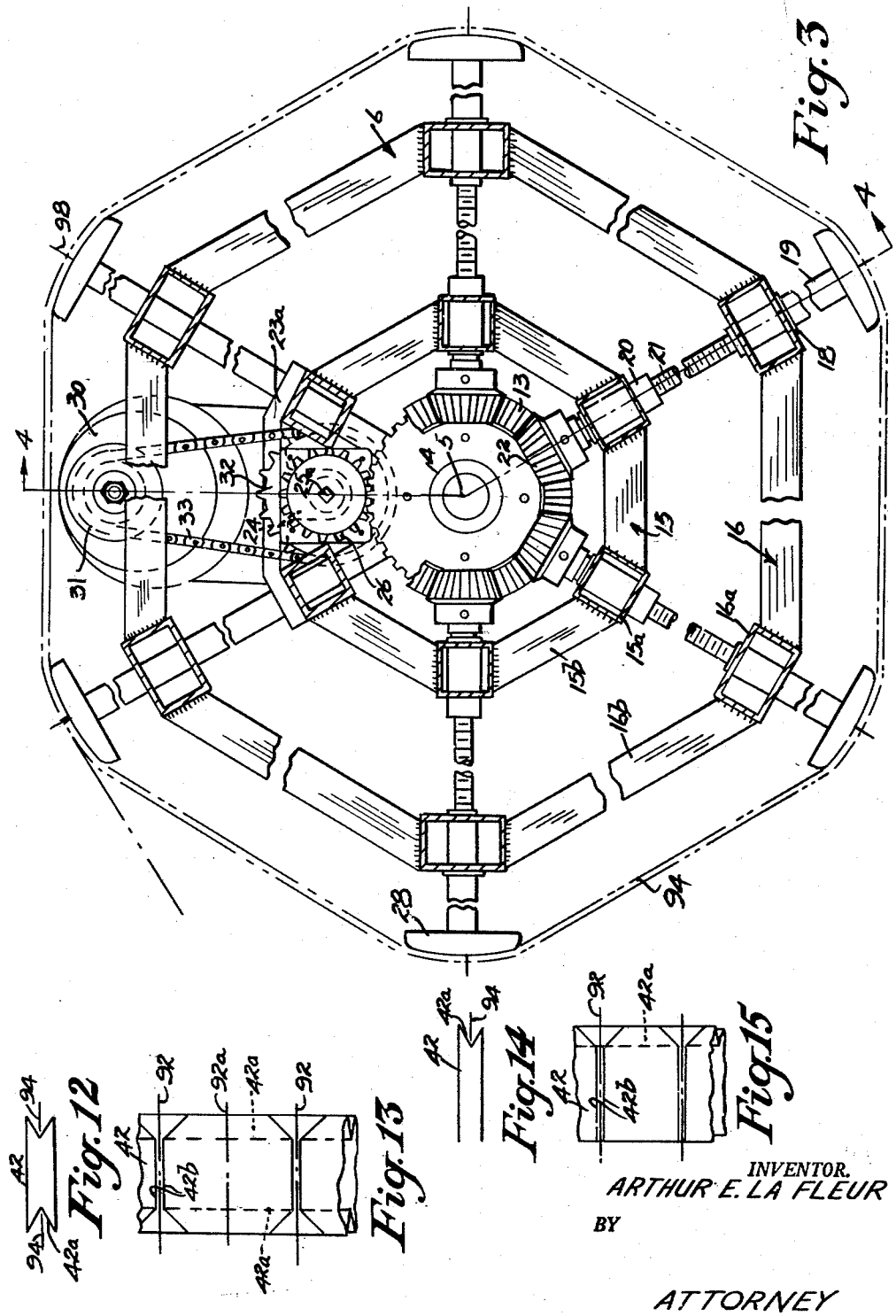

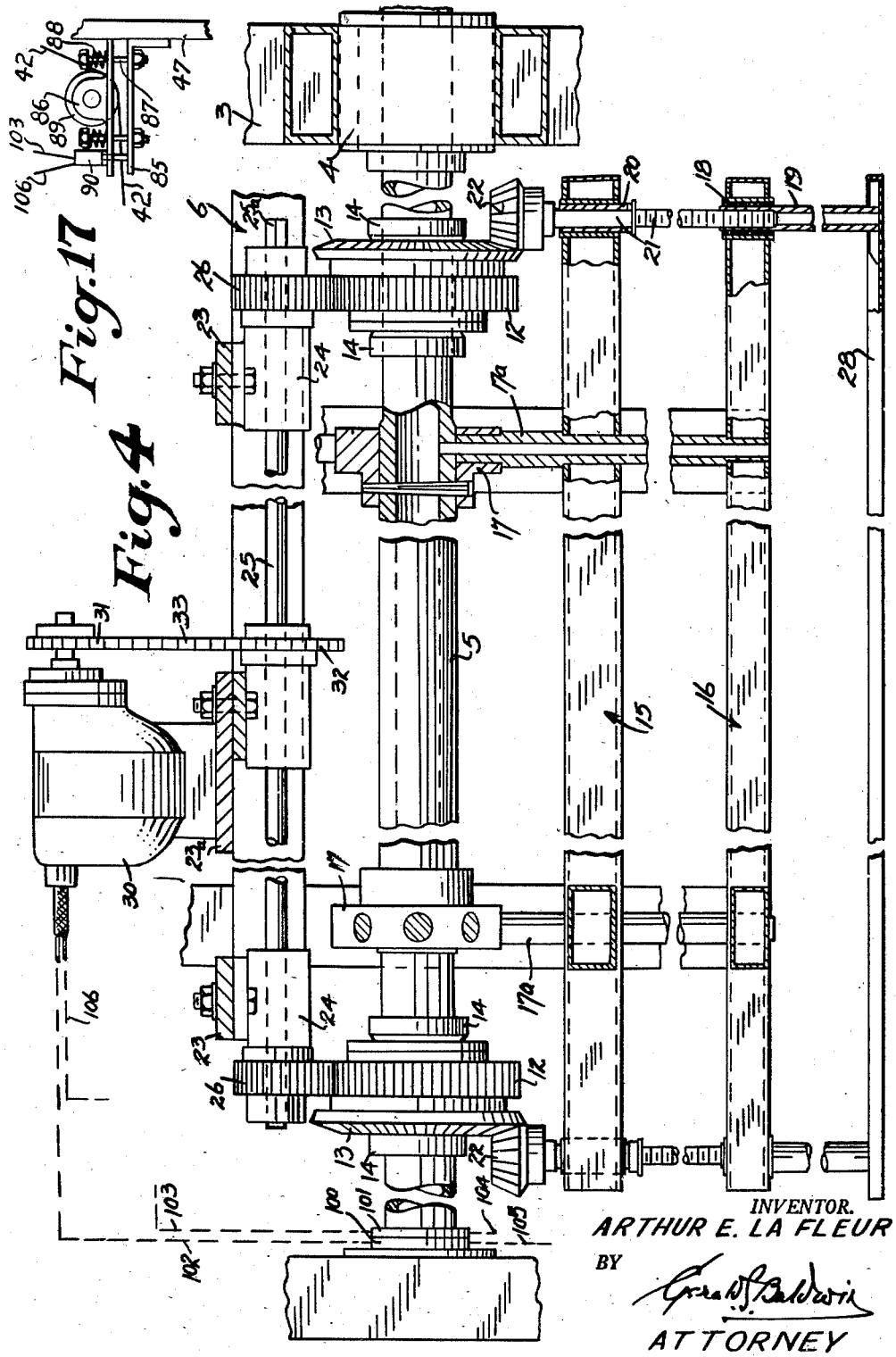

United States Patent Office 2,815,063
Patented Dec. 3, 1957

2,815,063

PLASTIC BAG MAKING MACHINE

Arthur E. La Fleur, Clawson, Mich.

Application January 17, 1955, Serial No. 482,197

10 Claims. (Cl. 154—1)

This invention relates to improvements in machines for making bags of plastic film.

It is an object of the invention to provide a machine for making such bags wherein a continuously turning rotor is provided around which the plastic film travels, and wherein spaced sealing irons are mounted on the rotor to bear against the plastic film during its passage around the latter to insure prolonged contact of each iron in turn with the said material so that highly satisfactory seals or welds are formed across the film when the irons are maintained at a relatively low heat.

Another object of the invention is to provide such a machine including a winding rotor onto which the plastic film is wound after leaving the sealing rotor; wherein means are provided for turning both rotors at the same speed; and wherein means are provided for automatically maintaining the diameter of the outer layer of plastic film wound onto the winding rotor substantially the same as that of the sealing rotor irrespective of the number of layers of the material wound around the winding rotor, to insure that the seals formed across the bags extend one over the other in radial alignment to facilitate subsequent severance of the bags from one another.

A further object of the invention is to provide such a bag making machine wherein endless belts are provided between which the plastic film is supported and by which the film is conducted to and around the sealing rotor and which part from the film before the latter reaches the winding rotor; wherein means are provided for driving both the endless belts; and wherein the movement of the endless belts is utilized for turning both the sealing and the winding rotors.

Another object of the invention is to provide such a bag making machine wherein at least one endless slip sheet is automatically fed into a gusset provided along at least one side of folded bag material prior to the passage of the latter around the sealing rotor. This slip sheet spaces the folded bag material on opposite sides of the gusset so that aligned welds may be simultaneously formed to join two portions of the material on each side of the slip sheet without sealing the pieces of material on opposite sides of the gusset to one another.

Having thus briefly stated some of the objects and advantages of the invention, I will now describe a preferred embodiment thereof with the aid of the accompanying drawings, in which:

Figure 1 is a side elevation of the invention.

Figure 3 is a side elevation of the winding rotor.

Figure 4 is a section on the line 4—4 of Figure 3.

Figure 6 is a perspective view showing a detail and taken substantially on the line 6—6 of Figure 1.

Figures 7 and 8 are perspective views of a bag made of the preformed plastic film shown in Figures 12 and 13 and sealed by irons shown in Figure 9.

Figure 12 is a diagrammatic cross sectional view of the preformed plastic film used for making bags shown in Figures 7 and 8, wherein opposed slip sheets are indicated in the gussets.

Figure 13 is a diagrammatic view of a length of the plastic film shown in Figure 12, wherein lines across the film indicate where the latter is cut subsequent to sealing.

Figure 14 is a diagrammatic cross sectional view of a piece of differently preformed plastic film used for making bags shown in Figure 16, and the single slip sheet used in this case is also indicated.

Figure 15 is a diagrammatic view of a length of the plastic film shown in Figure 14, wherein lines across which the film is cut subsequent to sealing of the bags, are indicated.

Figure 16 is a perspective view of a bag made of plastic film preformed as shown in Figures 14 and 15 and sealed by irons shown in Figure 11.

Figure 17 is an enlarged detail showing the means for intermittently moving the arcuate plates on the winding rotor inwardly to compensate for the increasing thickness of the film being wound thereon.

Figure 2:
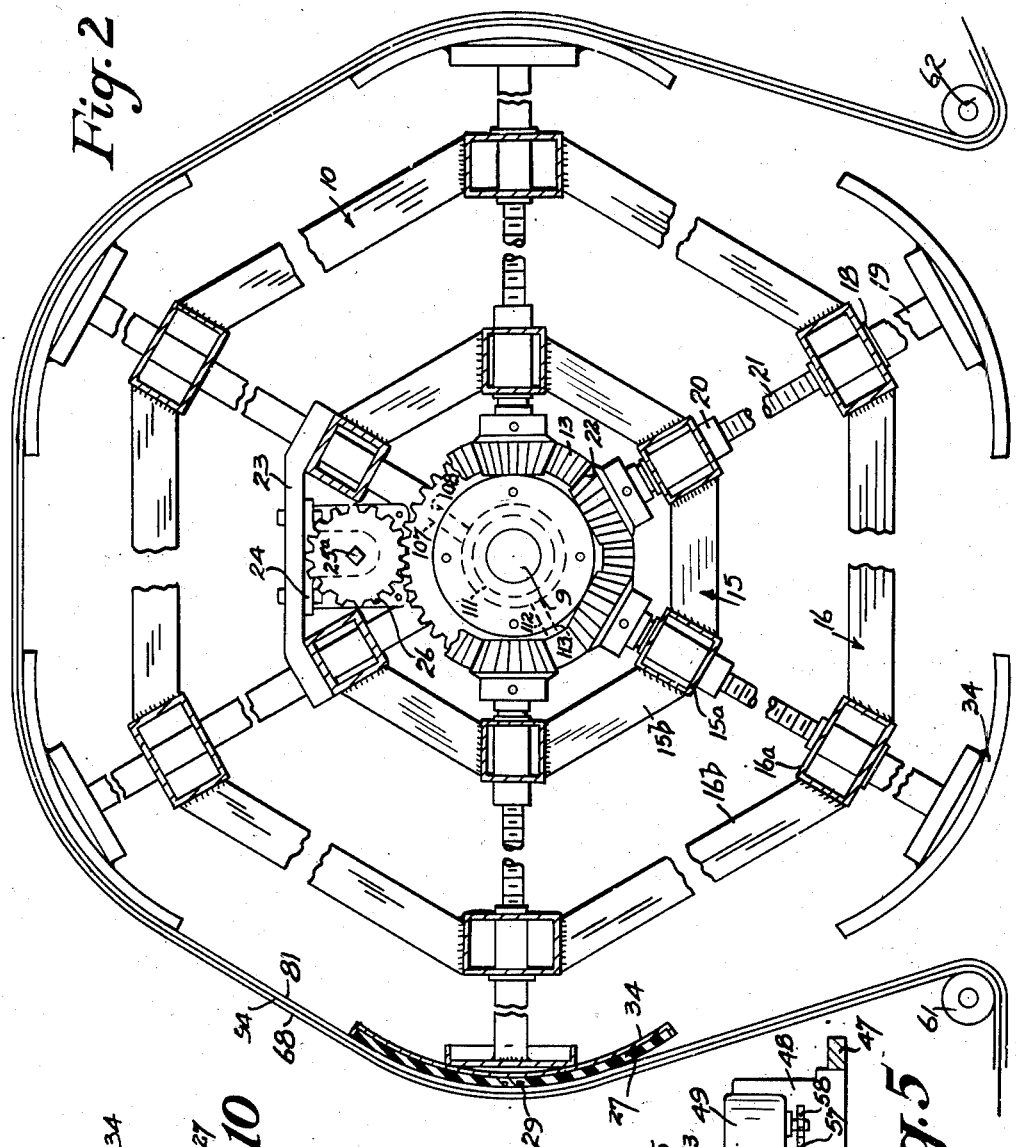
Figure 2 is a side elevation of the sealing rotor.

Referring to the drawings, 1 designates a substantially rectangular frame, made in the present instance of structural members. Welded or otherwise suitably secured to each side of the frame 1 adjacent one extremity are two longitudinally spaced uprights 3 so arranged that each is in transverse alignment with one on the opposite side of the frame. Rotatably mounted in bearings 4 each of which is suitably supported by and between the uprights 3 on one side of the frame is a shaft 5 on which a winding rotor 6 is secured. Suitably welded or otherwise secured to each side of the frame 1 adjacent its opposite extremity are two longitudinally spaced uprights 7 so arranged that each upright on one side of the frame is in transverse alignment with one upright on the opposite side. Rotatably mounted in bearings 8 each of which is suitably supported by and between the uprights 7 on one side of the frame is a shaft 9 on which a sealing rotor 10 is mounted. Fixed on one extremity of each shaft 5 and 9 is a sprocket 5a and 9a, respectively, and passing around the said sprockets is an endless chain 11.

I will now describe the construction of the rotors 6 and 10 which are in many respects identical. Freely mounted around the shaft 5, or 9, toward each extremity are a spur gear 12 and a bevel gear 13 secured to one another, and mounted around the shaft adjacent each pair of gears 12 and 13 are collars 14.

Provided around the shaft 5, or 9, and extending transversely substantially the full distance between the uprights 3, or 7, is an inner and an outer reinforcing member 15 and 16, respectively, both of which in the present instance are hexagonal. The inner reinforcing member 15 consists of a plurality of bars 15a extending parallel to and equidistant from the axis of the shaft 5, or 9, and 15b denotes ties each of which is preferably welded at its extremities to two adjacent bars 15a so that the ties together form a hexagon adjacent each extremity of the said member. The outer reinforcing member 16 is similar to the member 15 and is spaced around the latter and consists of a plurality of bars 16a parallel with and equidistant from the axis of the shaft 5, or 9, held in their relative positions by hexagonally arranged ties 16b which are welded thereto. Projecting radially from collars 17 secured around the shaft 5, or 9, are a plurality of spoke-like arms 17a each of which intermediately of its length extends through and engages the inner reinforcing member 15 and terminates at its outer extremity in and is secured to the outer reinforcing member 16. Thus the members 15 and 16 are held immovable relative to one another and substantially coaxial with the shaft 5, or 9. Mounted in and extending through the outer reinforcing member 16 are a plurality of bushings 18 through each of which a tubular supporting element 19 is axially movable. These tubular elements 19 are internally threaded from their inner extremities. 20 denotes bushings mounted in and extending radially through the inner member 15. Projecting through each bushing 20 is a spindle 21 having a bevel pinion 22 secured on its inner extremity which meshes with one of the bevel gears 13. The outer portion of each spindle 21 extends into and is in threaded engagement with one of the tubular supporting elements 19, so that upon rotation of the gears 13 the spindles 21 are turned to impart movement in a radial direction, either inwardly or outwardly, to the said elements 19.

Secured to the inner reinforcing member 15 are bases 23 having bearings 24 mounted thereon which support a shaft 25 for rotation; this shaft extends parallel with the shaft 5, or 9, and has pinions 26 fixed thereon each of which meshes with one of the spur gears 12. Suitable means are provided for manually turning the shaft 25 and thereby rotating the threaded spindles 21, in the present instance one extremity 25a of the said shaft is multi-sided to receive a crank—not shown.

On the winding rotor 6 an arcuate winding plate 28 is secured to the outer extremity of each transversely aligned pair of supporting elements 19, and in this case an additional base 23a is secured to the inner reinforcing member 15 upon which an electric motor 30 is mounted. Secured around the shaft of the motor 30 is a sprocket 31 which is in alignment with a sprocket 32 fixed on the shaft 25. Passing around the sprockets 31 and 32 is an endless chain 33. Thus the motor may be employed for changing the diametrical distance between opposed pairs of plates 28. On the sealing rotor 10 arcuate sealing plates 34 are secured upon the outer extremities of the supporting elements 19. The outer faces of the plates 34 are dished to receive a suitable insulating material, as shown at 27, in which electrically heated sealing irons or elements 29 are mounted to project outwardly therefrom.

Beyond the extremity of the frame 1 adjacent which the sealing rotor 10 is mounted are bearings 40 which support opposite extremities of a roller 41 around which a stock of plastic film 42 is wound. Supported on opposite sides of the extremity of the frame 1 adjacent the roller 41 and intermediately of the height of the said frame are bearings 43 which support a roller 44 the length of which is substantially the same as that of the rotor 10. The roller 44 is also parallel with the said rotor. Mounted also on opposite sides of the frame 1 above the rotor 10 are other bearings 45 which support the opposite extremities of a roller 46. Forming part of each side of the frame 1 between the sets of uprights 3 and 7 are other spaced parallel uprights 47 one longitudinally opposed pair of which supports a platform 48 on which a motor 49 is secured. Mounted on one transversely opposed pair of the uprights 47 are bearings 50 and 51 which support opposite extremities of drive rollers 52 and 53, respectively. The peripheries of the rollers 52 and 53 are substantially in contact with one another and rotate in opposite directions. Secured to one extremity of each of the rollers 52 and 53 and meshing with one another are gears 54 and 55, respectively, and mounted on the roller 53 is a sprocket 56 which is driven by an endless chain 57 which also passes around a sprocket 58 fixed on the shaft of the motor 49.

Secured on opposite sides of the frame 1 beneath the sealing rotor 10 and on opposite sides of the vertical axis of the latter are opposed pairs of bearings 59 and 60 which support rollers 61 and 62, respectively, for rotation. Mounted on opposite sides of the frame somewhat above the base thereof and adjacent its extremity beyond which the stock carrying roller 41 is located are vertically opposed bearings 63 and 63a which support rollers 64 and 64a, respectively, the adjacent faces of which are in close proximity to one another.

Secured at its opposite extremities to the frame 1 and extending downwardly and inwardly from the end of the frame adjacent the stock roller 41, and upon each side of the frame, is an inclined guide 65, and mounted for sliding movement along each guide is a weighted bearing 66. These bearings support opposite extremities of a tension roller 67.

An endless belt 68, hereinafter referred to as the pressure belt, passes between the rollers 52 and 53 and around the former by which it is driven, over the roller 46, around the roller 44, over the tension roller 67 and around the rollers 64 and 61. The belt 68 also passes around the major portion of the periphery of the sealing rotor 10, the roller 62 and to the rollers 52 and 53 between which it passes.

Extending downwardly and inwardly toward the axis of the sealing rotor 10 from the uprights 47 adjacent the latter are transversely aligned inclined guides 70, and mounted for sliding movement along each guide 70 is a weighted bearing 71. Supported at its extremities in the bearings 71 is a tension roller 72. Supported on opposite sides of the frame 1 at substantially the same elevation as the bearings 59 and 60 are other bearings 73 in which opposite extremities of a roller 74 are mounted. It will be noted that this roller 74 is located more or less vertically beneath the roller 72. Mounted on opposite sides of the frame 1 between the bearings 73 and the stock roller 41 and at a lower elevation than the bearings 73 are other opposed pairs of bearings 75 and 76 which support the extremities of rollers 77 and 78 respectively.

A second endless belt 81, hereinafter referred to as the carrier belt, passes between the rollers 52 and 53, and around the latter by which it is driven, over the tension roller 72 and the rollers 74, 77 and 78, and over the roller 64a which is mounted in the bearings 63a beneath and immediately adjacent the roller 64. The carrier belt 81 then carries the plastic film 42 between it and the tension belt 68 around the roller 61 and the sealing rotor 10. The carrier belt is in direct contact with the sealing rotor and the pressure belt holds the plastic film firmly against the carrier belt so that seals are made through the latter by the sealing irons 29 across the plastic film. After the belts 68 and 81, with the film between them, leave the rotor 10 they pass around the roller 62 and between the drive rollers 52 and 53. The plastic film then travels around a roller 83 mounted at its extremities in bearings 84 secured to the pair of transversely opposed uprights 47 on opposite sides of the frame 1 adjacent the sealing rotor 10. Mounted on the other transversely opposed pair of uprights 47 are horizontal plates 85 on which bearings 86 are provided. Extending through the plates 85 and the bearings 86 are bolts 87 around which springs 88 are mounted above the said bearings so that when a predetermined upward pressure is exerted by the plastic film against the underside of a roller 89 mounted in the bearings 86 the said roller and its bearings are lifted and an electric switch 90 mounted on one of the bearings is closed. From beneath the roller 89 the plastic film 42 passes to the winding rotor 6 around the arcuate plates of which it is wound.

From the foregoing it will be seen that the sealing rotor 10 is turned by the pressure belt 68 which passes thereover, and that the winding rotor 6 is rotated by the sealing rotor through the endless chain 11. It is evident that as the rotors turn the number of layers of plastic film upon the winding rotor 6 increases, thereby increasing the outer diameter of the wound roll of plastic film. If the diameter of the rotor 6 remained constant progressively increasing strain would be exerted upon the film between the two rotors. It is for that reason that the switch 90, actuated by tension exerted by the film 42 upon the roller 89, is provided. The switch 90 is connected to the motor 30 on the winding rotor 6 so that when a predetermined tension is exerted by the film and raises the roller 89 the switch cuts in the said motor which turns the shaft 25 on that rotor and moves its supporting elements 19 and the arcuate plates 28 inward. As soon as the diameter of the rotor 6 has been sufficiently reduced to relax the tension on the plastic film 42 and pressure is no longer exerted against the switch 90 the latter again operates to cut out the aforesaid motor 30. The manual means for turning the shafts 25 on the two rotors is in order to space the sealing irons 29 upon the sealing rotor 10 to conform to the size of the bags to be made, and to adjust the diameter of the winding rotor 6 to conform to that of the sealing rotor 10 prior to commencement of operation.

Figures 9, 10:
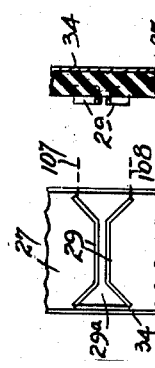
Figure 9 is a front elevation of a sealing iron employed for making bags shown in Figures 7 and 8.
Figure 10 is a cross sectional view of Figure 9.

From the diagrammatic views shown it will be seen from Figures 9 and 11 that in each sealing plate 34 two spaced transverse elements 29 are provided either of which may be employed to form a pair of seals 42b across the plastic film so that the latter may subsequently be cut in any preferred manner between adjacent pairs of seals. Moreover while two somewhat differently shaped transverse elements are shown in Figures 9 and 11 to produce differently shaped seals it is understood that the elements may be shaped in many different ways to produce bags of different forms.

Figure 11:
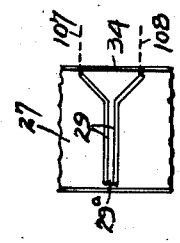
Figure 11 is a plan view of a modified form of sealing iron.
Figure 5:
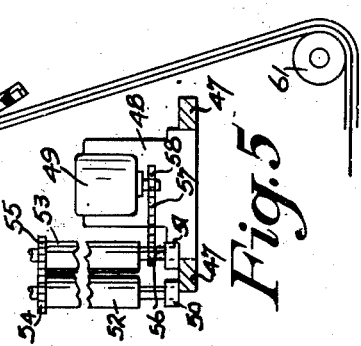
Figure 5 is a detail showing the driving rollers for the belts.

If the plastic film on the stock roller 41 consists of material centrally and longitudinally folded upon itself so that it has a folded edge along one longitudinal margin and separate longitudinal edges along its opposite margin, then bags may be formed by employing sealing plates 34 with elements 29 like those shown in Figure 11. The parallel portions of the elements extend across the plastic film from its separate longitudinal edges and the inclined extremities of the sealing elements extend over the folded longitudinal margin of the film. When bags are made in this manner the separate longitudinal edges of the film form open tops and the folded longitudinal margins form the closed bottoms. The plastic film 42 is fed between the pressure belt 68 and the carrier belt 81 from the roller 41 adjacent the rollers 64 and 64a to pass with the said belts between the last named rollers.

However if the plastic film 42 wound upon the roller 41 is either tubular as shown in Figures 12 and 13 and has gussets 42a formed along its opposite longitudinal margins, or is open along one longitudinal margin and closed by a gusset 42a along its opposite margin as shown in Figures 14 and 15, then additional means must be employed for preventing the sealing of all the thicknesses of the plastic film to one another across the gusset or gussets. But before describing the means employed for insuring that separate aligned seals are formed between each outer layer of the plastic film and only the side of the gusset contiguous thereto, it may be noted that when opposed gussets are provided as shown in Figures 12 and 13 each transverse seal 42b forms the bottom of a bag as shown in Figures 7 and 8 and the plastic film is subsequently cut as indicated at 92 not only between each adjacent pair of seals, but is also cut as indicated at 92a centrally between each adjacent pair of cutting lines 92. Each line 92a then denotes the open top of two bags. If only a single gusset is provided as shown in Figures 14 and 15 the plastic film is cut only between adjacent pairs of seals 42b so that a seal occurs on each side of the bag and the open side of the plastic film forms the top of the bag, as shown in Figure 16.

In order to insure that each side of each gusset 42a is sealed only to the adjacent outer side of the folded plastic film 42 a relatively narrow endless slip sheet 94 is automatically inserted in each gusset prior to the introduction of the film between the belts 68 and 81 and travels in the gusset until the belts have passed between the drive rollers 52 and 53. The slip sheet then travels with the carrier belt 81 around the rollers 72, 74, 77 and 78 and beneath the roller 64a to a vertical roller 95 supported on a mounting 96 from which a lateral guide arm 97 extends. The slip sheet after leaving the roller 95 is so deflected by the arm 97 that it passes into a gusset 42a before the plastic film is engaged between the endless belts 68 and 81.

Due to the fact that the diameter of the winding rotor 6 gradually increases as the layers or winds of plastic film thereon increase, the inner layers or winds have a tendency to sag between the winding plates 28. In order to prevent displacement of sagging layers of the film and to hold them one upon the other engaging pins 98 are provided which project radially in rows which extend transversely from the outer peripheries of the said plates 28 centrally of their width. As the diameter of the winding rotor is initially the same as that of the sealing rotor and the outer layer of plastic film upon the former is maintained substantially the same diameter as the sealing rotor throughout the operation of the machine, the rotors are relatively so set that the pins 98 engage the film between each adjacent pair of seals 42b substantially where the cutting lines 92 are to occur. Consequently to remove the wound film from the winding rotor it is merely necessary to cut through and across the wound layers thereon contiguous to one or more rows of the pins 98.

The belts 68 and 81 and the slip sheet 94 may be made of any suitable material such as fabric or paper through the latter is usually preferable due to the fact that it lasts longer, costs less, and does not have the same tendency to stretch. In any case the belt and the slip sheet, or sheets, 94, must be impregnated with suitable material for preventing a heat seal being formed between them and the plastic film during passage of the latter around the sealing rotor. Since the belts and slip sheet are so thin they have been shown by single lines spaced from one another for the sake of clarity, and for the same reason only the extremities of the plastic film have been indicated in Figure 1 and not the portion carried between the belts.

As the motor 30 rotates with the winding rotor 6 conventional collector rings 100 and 101 are provided on the shaft 5 from which leads 102, 103, 104 and 105 extend. The lead 102 is connected to the motor 30; the lead 103 is connected to the switch 90 from which another wire 106 extends to the motor 30; and the leads 104 and 105 are connected to a source of power—not shown. Thus the operation of the motor 30 is controlled by the switch 90 as hereinbefore described. The sealing irons or elements 29 are arranged in spaced pairs as shown in Figures 9 and 11. Two extremities of each pair of elements are connected by a lead 29a, and extending from the opposite extremities of each pair of elements are other leads 107 and 108. Since the elements 29 and their plates 34 are carried by the rotor 10, these leads 107 and 108 terminate in collector rings 111 indicated in Figure 2, and extending from the said rings are other wires 112 and 113 which are connected to a source of power—not shown. The motor 49 by which the belts 68 and 81, and by them the rotors 10 and 6, are driven, is stationary on the frame 1, and consequently leads 109 and 110 from the said motor are directly connected to a source of power—not shown.

What I claim is:

1. A machine for making bags of plastic film including a frame, a sealing rotor around which plastic film is adapted to extend, said rotor being rotatably mounted in said frame and having spaced sealing irons mounted transversely on its periphery, endless belts associated with said rotor for engaging the plastic film therebetween, and means for moving said belts and the plastic film around the periphery of the rotor, said belts being adapted to turn the rotor, and rollers mounted on the frame around which the endless belts and the plastic film are adapted to travel.

2. The combination in claim 1, wherein the plastic film moving means consists of the endless belts between which the film is adapted to be transported, and drive rollers around each of which one of the belts travel and by which that belt is driven.

3. The combination in claim 1, wherein the plastic film moving means consists of the endless belts between which the film is adapted to be transported, and tension rollers for maintaining a predetermined tension on said belts.

4. A machine for making bags of plastic film including a frame, a sealing rotor mounted thereon for rotation, spaced sealing means mounted transversely on the periphery of the rotor, rollers mounted on the frame parallel with the rotor, endless belts each extending around some of the rollers and upon one another around the periphery of the rotor whereby said belts are adapted to frictionally engage and carry plastic film between them around the rotor for engagement by the sealing means, means for maintaining each endless belt taut, and means for driving the belts and turning the rotor.

5. A machine for making bags of plastic film including a frame, a sealing rotor rotatably mounted therein and having transversely extending sealing irons thereon, means on the frame for turning the rotor and moving plastic film around said rotor in engagement with the sealing irons whereby the plastic film is transversely sealed at spaced intervals by said irons, and rollers mounted on the frame for guiding the plastic film during its passage to and from the sealing rotor, a winding rotor mounted on the frame onto which the plastic film is adapted to be wound after leaving the sealing rotor, means for turning the winding rotor when the sealing rotor is turned, and automatic means for decreasing the diameter of the winding rotor and thereby maintaining the diameter of the outer layer of plastic film on the winding rotor substantially the same as the diameter of the sealing rotor as the film accumulates around the winding rotor.

6. A machine for making bags of plastic film including a frame, a sealing rotor rotatably mounted therein and having transversely extending sealing irons thereon, means on the frame for turning the rotor and moving plastic film around said rotor in engagement with the sealing irons whereby the plastic film is transversely sealed at spaced intervals by said irons, rollers mounted on the frame for guiding the plastic film during its passage to and from the sealing rotor, and an endless slip sheet adapted to travel in a longitudinal gusset in one side of the plastic film around the sealing rotor, said slip sheet being engaged between the belts for movement with said film.

7. A machine for making bags of plastic film including a frame, a sealing rotor mounted thereon for rotation, spaced sealing means mounted on the periphery of the rotor, rollers mounted on the frame parallel with the rotor, endless belts each extending around some of the rollers and upon one another around the periphery of the rotor whereby said belts are adapted to carry plastic film between them around the rotor for engagement by the sealing means, means for maintaining each endless belt taut, means for driving the belts and turning the rotor, and a winding rotor mounted on the frame and having winding plates thereon, means for turning the winding rotor at the same speed as the sealing rotor to wind plastic film thereon after it leaves the belts, and automatic means for gradually reducing the diameter of the winding rotor as film is wound thereon so that the diameter of the outer layer or turn of film wound upon said winding rotor is maintained substantially the same as the diameter of the sealing rotor as the number of turns of film around the winding rotor increases.

8. A machine for making bags of plastic film including a frame, a sealing rotor mounted thereon for rotation, spaced sealing means mounted on the periphery of the rotor, rollers mounted on the frame parallel with the rotor, endless belts each extending around some of the rollers and upon one another around the periphery of the rotor whereby said belts are adapted to carry plastic film between them around the rotor for engagement by the sealing means, means for maintaining each endless belt taut, means for driving the belts and turning the rotor, a winding rotor mounted on the frame and having winding plates thereon, means for turning the winding rotor at the same speed as the sealing rotor to wind plastic film thereon after it leaves the belts, means for simultaneously adjusting the distance of all the sealing means from the sealing rotor axis, means for simultaneously adjusting the distance of all the winding plates from the winding rotor axis, and automatic means for gradually reducing the diameter of the winding rotor as the film is wound thereon so that the diameter of the outer layer or turn of the film on said winding rotor is maintained substantially the same as the diameter of the sealing rotor as the number of turns of film around the winding rotor increases.

9. A machine for making bags of plastic film including a frame, a sealing rotor mounted thereon for rotation, spaced sealing means mounted on the periphery of the rotor, rollers mounted on the frame parallel with the rotor, endless belts each extending around some of the rollers and upon one another around the periphery of the rotor whereby said belts are adapted to carry plastic film between them around the rotor for engagement by the sealing means, means for maintaining each endless belt taut, means for driving the belts and turning the rotor, and an endless slip sheet adapted to engage a gusset preformed in one longitudinal margin of the plastic film, said slip sheet being engaged between the endless belts for a portion of their travel including their movement around the sealing rotor, said slip sheet passing around some of the rollers with one of the belts, and means for feeding the slip sheet into the gusset prior to engagement of the plastic film between said belts.

10. A machine for making bags of plastic film including a frame, a sealing rotor mounted thereon for rotation, sealing plates on the periphery of the rotor having circumferentially spaced transverse sealing irons mounted thereon in adjacent pairs, rollers mounted on the frame, endless belts each extending around some of the rollers and upon one another around the periphery of the rotor whereby said belts are adapted to carry plastic film between them around the rotor for engagement by the sealing irons to form adjacent pairs of seals transversely of the film, means for maintaining each endless belt taut, means for driving the belts and turning the rotor, a winding rotor mounted on the frame, means for turning the winding rotor by rotation of the sealing rotor, winding plates on the periphery of the winding rotor on which the plastic film is adapted to be wound after leaving the sealing rotor, transversely arranged pins projecting radially from the winding plates to engage the film between adjacent pairs of seals and prevent displacement of the film as the turns or layers of film on the winding rotor increase, and means for maintaining the diameter of the outer layer or turn of film on the winding roller substantially constant as the number of layers or turns of films thereon increase.

References Cited in the file of this patent

UNITED STATES PATENTS

| | | |
|---|---|---|
| 2,052,494 | Smith | Aug. 25, 1936 |
| 2,229,121 | Nye et al. | Jan. 21, 1941 |
| 2,522,346 | Carson et al. | Sept. 12, 1950 |
| 2,584,632 | Southwick | Feb. 5, 1952 |
| 2,631,509 | Whytlaw | Mar. 17, 1953 |
| 2,641,166 | Morrell | June 9, 1953 |
| 2,680,470 | Stanton | June 8, 1954 |
| 2,680,471 | Mercer | June 8, 1954 |